United States Patent [19]

Williams et al.

[11] Patent Number: 5,763,565
[45] Date of Patent: Jun. 9, 1998

[54] PROCESS FOR MAKING SELF-GELLED RESIN SOLUTIONS FOR INK FORMULATIONS

[75] Inventors: Theodore J. Williams, Panama City, Fla.; Zheng Lu, Naperville, Ill.

[73] Assignee: Arizona Chemical Company, Panama City, Fla.

[21] Appl. No.: 784,733

[22] Filed: Jan. 13, 1997

Related U.S. Application Data

[63] Continuation-in-part of Ser. No. 438,606, May 10, 1995, Pat. No. 5,635,591.

[51] Int. Cl.$^6$ ............................................ C09F 1/00
[52] U.S. Cl. ..................... 130/210; 530/210; 530/211; 156/21 C; 156/26 R; 156/31.41; 156/31.73; 101/450.1; 101/463.1; 101/DIG. 43
[58] Field of Search ......................... 530/210, 211; 151/450.1, 463.1, DIG. 43; 156/31.41, 31.73, 26 R, 21 C

[56] References Cited

U.S. PATENT DOCUMENTS

| | | | |
|---|---|---|---|
| 2,478,490 | 8/1949 | Krumbhaar | 525/54.4 |
| 3,121,914 | 2/1964 | Olsen et al. | 18/12 |
| 3,207,205 | 9/1965 | Briskin et al. | 159/47 |
| 3,387,073 | 6/1968 | Larsen | 264/211 |
| 3,486,864 | 12/1969 | Van Der Schee et al. | 23/285 |
| 3,642,964 | 2/1972 | Rausch, Jr. et al. | 264/40 |
| 4,075,143 | 2/1978 | Schelhaas et al. | |
| 4,170,578 | 10/1979 | Schelhaas | |
| 4,189,410 | 2/1980 | Laurito | 260/23.7 |
| 4,218,251 | 8/1980 | Sanders | |
| 4,253,397 | 3/1981 | Emmons et al. | |
| 4,255,196 | 3/1981 | Emmons et al. | |
| 4,304,601 | 12/1981 | Sharp | 106/29 |
| 4,320,048 | 3/1982 | Harmuth | 523/333 |
| 4,434,007 | 2/1984 | Lenox et al. | 106/26 |
| 4,528,036 | 7/1985 | Rudolphy | 106/30 |
| 4,597,927 | 7/1986 | Zeitler et al. | 264/85 |
| 4,693,846 | 9/1987 | Piccirilli et al. | 260/97 |
| 4,704,165 | 11/1987 | Nakamura et al. | 106/308 M |
| 4,857,624 | 8/1989 | DeBlasi et al. | 528/129 |
| 4,963,188 | 10/1990 | Parker | 106/20 |
| 5,021,538 | 6/1991 | Crews | 528/129 |
| 5,208,319 | 5/1993 | Schilling | 530/210 |
| 5,405,932 | 4/1995 | Bender et al. | |

OTHER PUBLICATIONS

Burke, Roger E., "Rosin–based Printing Inks", *Naval Stores*, pp. 665–700. Published before 1994.

Petrone, John P., "Synthetic Resins for Inks", *American Ink Maker*, Apr., 1971.

Thiele, William, *Twin–Screw Extruders as Reactors*, The University of Toronto pp. 1–17, Published before 1994.

Vincent, Dr. John E., "Chemistry of Aluminum–Organics in the Preparation of Ink Vehicles and Gel Varnishes", *American Ink Maker*, Oct., 1984.

*Primary Examiner*—Duc Truong
*Attorney, Agent, or Firm*—Luedeka, Neely & Graham, P.C.

[57] ABSTRACT

The specification describes a process for making gelled ink resins which exhibit improved properties. In a preferred embodiment, a rosin-based or hydrocarbon-based resin is mixed with an organic solvent and reacted with a crosslink agent under conditions sufficient to produce a substantially covalently cross-link gelled resin. The resulting gelled resin resists viscosity breakdown under high shear conditions and may be used directly for making ink compositions, obviating the need for further gelation and avoiding the use of conventional organo-metallic gelling agents.

32 Claims, 2 Drawing Sheets

PROCESS FOR MAKING SELF-GELLED RESIN SOLUTIONS FOR INK FORMULATIONS

RELATED APPLICATIONS

This application is a continuation-in-part of application Ser. No. 08/438,606, filed May 10, 1995, now U.S. Pat. No. 5,635,591.

FIELD OF THE INVENTION

The present invention relates generally to high viscosity gelled resin compositions and to methods for making gelled ink resins. More particularly, the invention relates to an in situ process for making self-gelled ink resin solutions which exhibit improved rheological performance characteristics for use in high speed printing machines.

BACKGROUND OF THE INVENTION

Conventional rosin and hydrocarbon-based resins are prepared as relatively low viscosity resins in stirred reaction vessels. Such resins are usually highly branched and possess very broad molecular weight distributions. The product may even contain some fraction of crosslinked gelled structures, but this fraction is typically limited in quantity by virtue of the inability of a stirred tank vessel to handle the very high molten viscosity and non-Newtonian behavior that normally accompanies the presence of a gelled resin structure.

Lithographic ink vehicles or varnishes may be prepared from existing resins by dissolving/dispersing the resins in lithographic ink solvents and then subjecting the mixture to a so-called "gelling" reaction using an aluminum-based gelling agent. The role of the aluminum compound in the preparation of lithographic ink vehicles has typically been that of controlling the rheological properties of the ink vehicle.

Known aluminum gelling compounds for use in preparing ink vehicles may be classified as: 1) aluminum soaps, 2) aluminum alkoxides, 3) chelated alkoxides and 4) oxyaluminum acylates. However, aluminum compounds require the generation or existence of an aluminum hydroxyl functionality to form the ultimate rheology or gel structure. The resulting gel structure is the result of relatively weak coordinate covalent or hydrogen bonding of the aluminum hydroxyl species with the binder resin.

Since the coordinate covalent and hydrogen bonds formed with the aluminum gelling agents are relatively weak bonds, typically only about 5 to 10% as strong as covalent bonds, the gel structure afforded by such bonds is substantially degraded under the high shear conditions associated with modern lithographic printing. While some degree of thixotropic behavior is important for successful printing, there are limits to the degree of viscosity changes which can be tolerated before unwanted side effects emerge. Modern high speed printing machines rapidly degrade conventional ink vehicles to a significant degree. One consequence of the loss of gel structure in an ink vehicle is the development of misting, which is much more pronounced in high speed machines leading to potential losses in print quality and degradation of the work environment. Misting occurs as a result of ink shear caused by a paper web moving through the printer at high speeds thereby forming minute droplets or mists of ink. Inks which maintain higher viscosities under high shear printing conditions are less likely to form mists.

Furthermore, the reaction characteristics of aluminum compounds with binder resins dissolved in mineral oil are not easy to control and depend, to a great extent both on the type of resin and on the temperature used when mixing the aluminum compound with the resin. Typically, the binder resin is dissolved in mineral oil at a temperature within the range of from about 160° to about 180° C., the aluminum gel forming agent is added followed by reaction after which the solution is cooled to room temperature. In the case of highly reactive gel-forming agents such as aluminum alcoholates, the temperature must initially be lower than the temperature used to dissolve the resin in mineral oil in order to achieve controlled gel formation. Less reactive aluminum compounds such as aluminum chelates are also advantageously added at a lower temperature in order to avoid undesired premature reactions with dissolved resin which can lead to agglomeration. After the gel-forming agent is added, the temperature of the resin solution must be raised again to 180° C. and then cooled again to room temperature to achieve the desired gel formation. Too high a temperature can lead to destruction of the gel. Accordingly, precise temperature control is required when reacting aluminum compounds with the resin so that the tack of the resulting gel is not modified in an undesired manner.

In order to prevent binder resins which have a low compatibility with mineral oil from precipitating from the solution, solubilizing agents are often required with conventional gelled resins. Suitable solubilizing agents include vegetable oils, alkyd resins or long-chain, high-boiling alcohols. However, these additives can lead to delays in drying of the printing film.

Another problem associated with the use of gelling agents is that manufacturers of ink vehicles are shifting to the use of solvents from renewable resources and solvents which provide significantly lower levels of volatile organic compounds (VOC) in the inks. Examples of such solvents are various fatty acid esters. Fatty acid esters are more polar than mineral oil solvents and the use of more polar solvents increases the difficulty of obtaining strong gel structure with conventional resins since the gellant also has affinity toward the solvent. Because of the increased solvency power of such solvents, it is necessary to use even more gellant which results in the production of a product with less than optimal resistance to shear induced breakdown.

Yet another undesirable aspect of the use of gelling agents is that such agents are typically the most expensive ingredient in the varnish formulation on a weight percent basis. Furthermore, the gel reaction requires a separate reaction step thereby consuming time, energy and man-power for the production of gelled ink vehicles. Hence, the use of organo-aluminum gelling agents presents a definite economic liability.

Additionally, the lithographic printing industry is shifting to the use of higher molecular weight/higher solution viscosity "self structuring" ink resins to improve the press performance of inks during high speed press operations. New generation web-offset lithographic printing presses are capable of achieving printing speeds up to about 3000 feet/minute. In order for these ink resins to be effective in high speed printing presses, increased compatibility of the resins with the printing equipment is important.

Various attempts have been made to provide ink vehicles which are more compatible with high speed printing machines. U.S. Pat. No. 5,405,932 to Bender et al. describes synthetic resins which have self-gelling properties when mixed with mineral oils to form resin solutions without the need to use aluminum gelling agents. The synthetic resins are prepared by using a magnesium compound as a catalyst for resol formation from phenols and aldehydes in a natural resin melt and for natural resinic acid esterification. Water formed during the condensation and esterification reactions is removed by azeotropic distillation with co-use of an inert organic solvent capable of forming an azeotrope with water. According to Bender et al., only the combination of the use of a magnesium compound as a condensation catalyst and the use of an inert solvent capable of azeotropic distillation of water from the reaction mass results in a product which is self-gelling when added to a mineral oil. However, the synthetic resins are characterized as being reversibly self-gelling and thus will not have suitably strong cross-link bonds. Hence, the gelled resin described by Bender et al. may also exhibit viscosity loss in an ink composition containing the gelled resin during high speed printing operations.

Japanese patent application JP4-168168 discloses the use of aluminum gelling agents to prepare ink compositions from cross-linked resins. A crosslinking reaction is conducted using no more than 1 wt. % crosslink agent at a temperature no higher than 180° C. prior to a gellation reaction conducted with an aluminum gelling agent. According to the disclosure in the '168 application, if more than 1 wt. % crosslink agent is used or if the reaction temperature is above 180° C., the solubility of the resin will be adversely affected. The crosslinking reaction is used primarily to alter the polar functionality and molecular weight of the binder resin in order to reduce the affinity of the ink varnish for water and is not directed to producing a self-gelled resin.

Likewise, Japanese patent application JP5-171089 is directed to ink varnishes which exhibit high gloss and improved setting and drying properties as a result of crosslinking a portion of the polar groups of the binder resin before the resin is gelled with a metal gelling agent. The agents used to reduce the number of polar groups in the resin are certain amino compounds, preferably melamine resin or benzoguanamine resin containing at least one functional group selected from methylol, alkoxy and imino groups, and the reaction is conducted below the softening point of the binder resin and before all of the resin is dissolved. The gellation reaction is conducted separately from the crosslinking reaction once the polar groups have been sufficiently cross-linked.

Despite attempts to provide suitable resins for modern printing machines, there remains a need for a gelled ink resin which does not exhibit significant loss of its viscous properties during high speed printing. A convenient method for assessing the viscosity loss in gelled ink resin is to determine the slope of the resin in solution, which is the rate at which sheer stress varies with shear rate. The slope is derived from the Standard Test Method for Viscosity of Printing Inks and Vehicles by the Falling-Rod Viscometer according to ASTM D 4040-89. In the ASTM method, the following equations are used to determine slope:

$$k = S/(D^N) \text{ or } \ln S = \ln k + N \ln D \quad (I)$$

and $$1/N = \ln D/(\ln S - \ln k) \quad (II)$$

wherein k is a constant related to the viscosity of the liquid, N is a measure of non-Newtonianism of the liquid as determined by the slope of the power law plot, D is the velocity gradient through the stressed liquid, S is shearing force per unit area and 1/N is the rate at which the shear stress varies with shear rate for the resin in solution (the slope of the resin in solution). Resin solutions having a slope of 1 represent Newtonian solutions. A solution with a slope of less than 1 represents a shear thinning solution, as is the case with most ink resin solutions. The smaller the slope, the more gel structures the solution has. A slope greater than 1 represents a shear thickening solution which is not often encountered in ink resin solutions.

A consequence of the loss of viscosity of an ink resin resulting from excessive shear is a loss of print sharpness. When a gelled ink resin is sheared to the extent that flow becomes significant, the printed dot is diffused thereby yielding excessive "dot gain" or poor print quality.

Because of the trend toward higher speed printing presses and the continuing need to improve the ink application process and print quality, there continues to be a need for improved resins for use as ink vehicles in the printing industry and improved processes for making the resins. One important goal is to develop a high viscosity self-gelled resin composition which causes the final ink to exhibit minimum misting under the high shear turbulent printing conditions of modern high speed printing presses.

Therefore, it is an object of the present invention to provide an ink composition containing a highly viscous ink resin and a process for making the same which results in fewer process steps.

Another object of the invention is to provide high viscosity ink resin compositions which reduce misting on high speed printing machines.

A further object of the invention is to provide high viscosity resin solutions for use in lithographic printing ink formulations to improve the properties of the formulations.

Still another object of the invention is to provide an in situ process for making self-gelled resin compositions of the character described with readily available, relatively inexpensive materials.

Another object of the invention is to provide a process for making high viscosity self-gelled resin compositions which enables improved control over the properties of the resins and which enables improved uniformity in the properties of large quantities of resin.

Yet another object of the invention is to provide a process for making high viscosity resin compositions for high speed printing applications which maintain their high viscosity even under the vigorous conditions associated with high speed printing.

An additional object of the invention is to provide a process for making self-gelled resin solutions of the character described which is cost effective and uncomplicated and does not require the use of highly specialized or complicated equipment.

SUMMARY OF THE INVENTION

With regard to the forgoing and other objects, the present invention is directed to a gelled ink resin and an in situ process for making a self-gelled ink resin solution having a high viscosity. According to one aspect of the invention, a process is provided for making a gelled ink resin which comprises mixing a rosin- or hydrocarbon-based resin with an organic solvent and a crosslinking agent to provide a reaction mass and then heating the mass under conditions sufficient to produce a substantially covalently cross-linked gelled resin solution which exhibits significantly increased viscosity as compared to the uncrosslinked resin solution and has improved stability against viscosity loss and elasticity degradation from mechanical and thermal stresses imposed during its use in high speed printing machines.

Gelled ink resin compositions produced by the method of the invention have been found to provide stable high viscosity vehicles for varnish and ink formulations even under high shear conditions. Accordingly, ink compositions containing a significant portion of the self-gelled resin made by the process of the invention have significantly improved misting characteristics because they are able to maintain their high viscosity and favorable elasticity properties even when subjected to severe mechanical and thermal stresses, whereas resin formulations that rely on the addition of gellants tend to lose their viscosity and elasticity properties under such conditions.

Another advantage of the process of the invention is that very high viscosity self-gelled resin solutions may be prepared without significant degradation of the resin because the crosslinking reaction takes place in situ in the solvent. Current practice for making high viscosity resins tends to induce degradation due to high temperatures required to "liquefy" the resins so that they can be dissolved in an ink solvent. The present invention overcomes this problem by first dissolving a relatively low molecular weight resin in an ink solvent at temperatures which do not induce significant degradation of the resin and then crosslinking the resin in situ in the solvent. As used herein "gelled resin", "self-gelled resin solution" and "resin solution" refer to a gelatinous mixture of highly cross-linked resin with solvent dispersed therein so as to swell the cross-linked resin. Hence, the composition is not a true "solution" as this term is generally understood, however, the term "solution" is used herein for convenience.

According to another aspect of the invention, a process is provided for making a self-gelled resin which comprises dissolving a resin selected from the group consisting of rosin- and hydrocarbon-based resins in a solvent to provide a reaction mixture and heating the reaction mixture at a temperature in the range of from about 120° to about 220° C. in the presence of a crosslink agent in an amount which is effective to induce formation of significant covalent cross-link bonds in the resin thereby substantially increasing the viscosity of the resin solution. The process enables the production of high viscosity self-gelled resins which are compatible with organic ink solvents and which maintain their Theological properties even under high shear conditions.

BRIEF DESCRIPTION OF THE DRAWINGS

The above and other aspects and advantages of the invention will now be further described in conjunction with the accompanying drawings in which.

DETAILED DESCRIPTION OF THE INVENTION

The present invention is directed to a self-gelled ink vehicle and to a process for making a gelled ink resin in situ which comprises mixing a rosin- or hydrocarbon-based resin with a high boiling organic solvent and a crosslinking agent to provide a reaction mass. The reaction mass is heated under conditions sufficient to produce a substantially covalently cross-linked gelled resin solution which exhibits improved structural stability under mechanical and thermal stresses imposed during high speed printing.

As used herein in relation to the term "resin", the terms "rosin-based" and "hydrocarbon-based" refer to and include any of the functionalized rosin-based resins used in ink manufacturing as well as the neutral and functionalized cyclic and dicyclic unsaturated hydrocarbon resin compounds derived from hydrocarbon feeds containing from about 5 to about 15 carbon atoms, which also find wide usage in ink making.

The term "rosin" as used herein will be understood to include gum rosin, wood rosin, and tall oil rosin. Rosin is derived from pine trees (chiefly *Pinus palustris* and *Pinus elliottii*). Gum rosin is the residue obtained after the distillation of turpentine from the oleoresin tapped from living pine trees. Wood rosin is obtained by extracting pine stumps with naphtha or other suitable solvents and distilling off the volatile fraction. Tall oil rosin is a co-product of the fractionation of tall oil which in turn is a by-product of the wood pulping process. The principle constituents of rosin are rosin acids of the abietic and pimaric types. The acids usually have the general formula $C_{19}H_{29}COOH$ with a phenanthrene nucleus. A preferred rosin for use in the present invention is tall oil rosin.

Rosin in its natural state has limited use in inks. Its main use is as a raw material for producing chemically modified rosin derivatives for various end uses. Important modified rosin and rosin derivatives used in printing ink manufacture are polymerized or dimerized rosin and esters thereof, metallic resinates, phenolic and/or maleic/fumaric modified rosins and their esters, and ester gums.

Important cyclic and dicyclic unsaturated hydrocarbon monomer feed streams which contain from about 5 to about 15 carbon atoms include cyclopentadiene and/or dicyclopentadiene, and their codimers with $C_4$ and $C_5$ dienes such as butadiene and piperylene. Inexpensive commercially available DCPD concentrates typically contain from about 40 wt. % to about 90 wt. % DCPD and therefore are most preferred, although very high purity DCPD which is blended with olefinic modifier compounds may also be used.

Olefinic modifier compounds which may be used with the cyclic and dicyclic unsaturated olefins include ethylene, propylene, butadiene, styrene, alpha-methyl styrene, vinyl toluene, indene, 1,3-pentadiene, isobutylene, isoprene, 1-butene, 1-hexene, 1-octene, limonene, alpha-pinene, beta-pinene, various acrylates and mixtures of these compounds. The olefinic modifier compound(s) is typically used in an amount ranging from about 0% to about 35% by weight based on the total weight of cyclic and dicyclic unsaturated olefin and modifier compound.

In addition to the use of olefinic modifiers compounds, the hydrocarbon- and rosin-based resins may be modified with distilled tall oil fatty acid, dimerized fatty acid, vegetable oils, phenolic species, maleic anhydride or fumaric acid and combinations thereof. The foregoing modifier species may be added before, during or after the hydrocarbon- or rosin-based resin is gelled. In addition, esterification of the acid modified resins with polyols such as pentaerythritol and/or glycerine may be conducted to further modify the hydrocarbon- or rosin-based resin backbone.

Any of the foregoing modified rosins, rosin derivatives and esters thereof, or cyclic and dicyclic unsaturated olefins derived and/or modified/esterified resins may be used as the "precursor" resin for the methods of the invention. Higher molecular weight/higher solution viscosity resins are most preferred with solution viscosities in the range of from about Z2.0 to about Z10 at 25° C. measured on one gram of resin dissolved in two grams of alkali refined linseed oil (1:2 ARLO) according to the Gardener Holdt bubble tube test method. Preferred precursor resins have a softening point in the range of from about 145° to about 180° C. and an acid number of no more than about 25. These higher molecular weight/higher solution viscosity resins are typically branched but are essentially not crosslinked. With higher molecular weight resins, the amount of crosslink agent needed to produce the gelled resins by the process of the invention is typically reduced, though the chemical characteristics of the resin may affect the amount of crosslink agent required.

Solvents which may be used to prepare the resins of the invention include vegetable oils such as linseed or soybean oil, hydrocarbon solvents such as aliphatic and aromatic solvents and lithographic ink solvents. A preferred solvent is an organic solvent, most preferably a high boiling organic solvent which has a boiling point in the range of from about 220° to about 310° C. For rosin-based or hydrocarbon-based resins, high boiling aliphatic solvents such as MAGIESOL (47, 470, 4700, N40HT, 500 or 520) which are commercially available from Magie Brothers Oil Company, Division of Pennzoil of Franklin Park, Ill. and EXXPRINT (283D, 314A, 588D or 705A) which are hydrocarbon oils available from Exxon Chemical Company of Houston, Tex. are preferred. The MAGIESOL solvents have a Kauri butanol value of from about 24 to about 27, an aniline point in the range of from about 75° to about 85° C. and a distillation range of from about 240° to about 280° C. EXXPRINT 283D has a Kauri butanol value of 25, an aniline point of 84° C. and a distillation range of 250° to 268° C.

The amount of solvent charged to the reaction vessel is related to the amount of crosslinked resin in the composition. Typically, the solvent will be charged in an amount that results in a resin composition containing from about 0.7 to about 1.5 parts by weight of solvent per part of resin charged.

Because the crosslinked resin is prepared in situ in the ink solvent, the size of the reaction mass and the associated reaction times are not believed to be critical. Accordingly, for batch reactions, reaction times may range from about 30 minutes to 8 hour or more. Since the cross-linking reaction is rapid, a continuous or semi-continuous process may also be used to prepare the gelled resin. Because the crosslinking reaction is conducted in the presence of an ink solvent, the resulting highly viscous covalently crosslinked product made in the reaction vessel already contains all of the important components of an ink varnish composition suitable for high speed printing machines, such as lithographic printing presses.

A key feature of the process of the invention is the formation of covalent cross-link bonds in the ink resin composition. In accordance with the invention, compounds which may be used to induce formation of this bonding may be selected from epoxy resins, organosilane compounds, aromatic dicarboxylic acid anhydrides, isocyanates and heat-reactive phenolic compounds which have been found to produce resins which exhibit superior solvency properties in lipophilic solvents as compared to high viscosity resins made using conventional non-metal crosslink agents. The preferred crosslink agents are phenolic compounds which are typically derived from phenol or any of a number of alkyl substituted phenols or combinations thereof that have been reacted under base catalyzed conditions with excess formaldehyde such that the final product is resinous in nature and has residual methylol functional groups. For example, a phenol-formaldehyde resin for use in practicing the invention may be made by reacting butyl-phenol and bisphenol-A with excess formaldehyde so that the resulting resin contains one or more reactive methylol groups.

To form covalent crosslink bonds in the precursor resin, the amount of crosslink agent may range from about 0.5 wt. % to about 15 wt. %, preferably from about 1.0 wt % to about 5.0 wt. % and most preferably from about 1.25 wt. % to about 3.5 wt. % based on the total weight of resin and crosslink agent introduced to the reaction vessel.

The resin, solvent and crosslink agent may be added to the reaction vessel in any order or essentially simultaneously, provided the reaction mass components are maintained under stirred reaction conditions for a period of time at a suitable reaction temperature so that a gelled resin having a desired target viscosity is produced. It is preferred, however, to first charge the reaction vessel with the solvent, heat the solvent to a temperature in the range of from about 120° to about 220° C., preferably from about 150° to about 200° C., and then charge molten resin to the reaction vessel.

The resin and solvent are preferably stirred and maintained at the reaction temperature for at least about 30 minutes or more, preferably about 1 hour, prior to adding the crosslink agent. The crosslink agent may be added to the reaction vessel all at once or incrementally over time until the target viscosity is obtained.

It is important that the reaction mass containing solvent, resin and crosslink agent be thoroughly mixed while being heated. During the mixing and heating, a crosslink reaction occurs with the resin, providing covalent crosslink bonds in the resulting product. Once the desired viscosity of the self-gelled resin is obtained, the reaction is terminated by cooling the reaction mass to about 100° C. The reaction product containing crosslinked resin and solvent is then discharged from the reaction vessel by gravity flow or pumping. Because a solvent is used to prepare a self-gelled resin solution, no special equipment is needed to stir the solution during reaction or to pump the solution from the reaction vessel once the reaction is complete.

In general, the crosslinking reaction need not be conducted under an inert gas atmosphere, however, such an inert gas atmosphere may be beneficial for some resins and may aid in controlling excessive color development. Furthermore, the reaction may be conducted under atmospheric, subatmospheric or superatmospheric pressure conditions. Atmospheric pressure is particularly preferred. Regardless of the pressure in the reaction vessel, it is important that the reactants be maintained at a sufficiently high temperature with intense mixing for a period of time sufficient to achieve the desired level of gelation of the resin in the reaction product.

Due to the in situ formation of crosslinked resin, the product produced by the process of the invention already contains a solvent, preferably a lithographic solvent such as MAGIESOL 47/470, EXXPRINT 283D, linseed oil or soybean oil, typically in an amount ranging from about 10 to about 50 wt. % solvent based on the total weight of the resin/solvent mixture. Accordingly, the gelled reaction product is ready for direct addition to the final ink composition with the other ink components, i.e., pigment, wax compounds and the like.

Although the ink-maker may add more gellant to the product at the time of the ink compounding, an advantage of the invention is that additional gellation on site generally will not be required since the product viscosity and Theological properties will typically meet or exceed the requirements the ink-maker would be attempting to achieve by addition of a gellant. Thus, the product obviates the need for gellant addition in the preparation of the final ink vehicle or ink composition, avoiding the time and expense associated with this extra step. In addition, since the target viscosity is achieved based on the known properties of the ink resin composition itself, there is a reduced need for gellation by the ink maker, thereby avoiding variations in the ink resin properties.

Further aspects of the invention will now be illustrated by reference to the following non-limiting examples.

EXAMPLE 1

Ink oil solvent, 66 parts by weight EXXPRINT-238D oil, was charged to a reaction vessel equipped with an agitator, temperature controller, condenser and nitrogen gas inlet. The solvent was heated to 160° C. under a nitrogen atmosphere. Then 54 parts by weight of commercially available phenolic modified rosin ester resin with an acid number of 18, softening point of 164° C., solution viscosity of Z6.6 in 33 wt. % linseed oil, tolerance of 200+mL was charged to the reaction vessel containing solvent to form a reaction mass. The reaction mass was heated to a temperature of 180° C. while stirring until all of the resin was dissolved (about 1 hour). At this point, 1.5 parts by weight of a crosslink agent were charged to the stirred reaction mass. The reaction was continued at 180° C. for 3 hours. After the 3 hour reaction period, the resin solution was cooled to 100° C. and discharged from the reaction vessel.

The solution viscosity of the crosslinked resin solution was determined by a standard test procedure, ASTM Designation D 4040-89 at 25° C. The softening point of the resin solution was determined according to ASTM Designation E28-67 and the final solution tolerance was determined by titrating 10 grams of the solution with MAGIESOL 47 to a cloud point (M47 tolerance). MAGIESOL 47 has a Kauri butanol value of 24.5, an aniline point of 82.8° C. and a distillation range of 240° to 277° C. The properties of resin solutions prepared by the foregoing procedure using a variety of crosslink agents with the same phenolic resin, solvent and solids content compared to a conventional resin solution containing no crosslink agent are shown in Table 1.

TABLE 1

| Sample No. | Crosslink Agent | Viscosity (poise) | Yield Value (dynes/cm$^2$) | Slope[1] | Shortness Ratio[2] |
|---|---|---|---|---|---|
| 1 | None | 394 | 5,383 | 0.76 | 13.7 |
| 2 | SP-134[3] reactive phenolic | 681 | 16,531 | 0.67 | 24.3 |
| 3 | tetraethoxysilane | 434 | 15,966 | 0.61 | 36.8 |
| 4 | BTDA[4] | 443 | 15,230 | 0.62 | 34.4 |
| 5 | DER-331[5] epoxy | 336 | 54,872 | 0.41 | 149.9 |
| 6 | dianisidine-diisocyanate | 499 | 28,811 | 0.55 | 57.7 |

[1]Slope — a parameter measuring how far the resin solution deviates from a Newtonian solution as determined by ASTM D 4040-89.
[2]Shortness Ratio — is the measure of gel structure and is calculated as the yield value divided by viscosity.
[3]SP-134 — is a heat reactive butylphenol/bisphenol-A containing reactive methylol groups commercially available from Schenectady Chemical Company of Schenectady, New York.
[4]BTDA — is 4,4,3,3-benzylphenoltetraacetic acid dianhydride.
[5]DER-331 epoxy — is an epoxy resin commercially available from Dow Chemical Company of Midland, Michigan.

In each of the samples of Example 1, the solids level was the same, about 46 percent by weight. As demonstrated by the foregoing samples, self-gelled resin solutions made according to the invention have substantially higher yield values and lower slopes than a resin solution having the same solids level which was prepared without the aid of a crosslink agent (Sample No. 1).

EXAMPLE 2

The procedure of Example 1 was used to prepare self-gelled resin solutions from a variety of resins. In each of the samples, the solvent was EXXPRINT-283D oil. Tridecyl alcohol (TDA) was used as a co-solvent to adjust the solubility of the resin. Each of the samples was crosslinked with SP-134 heat reactive phenol. Results of the crosslinking reaction are given in Table 2.

TABLE 2

| Sample No. | Resin | Crosslink Agent | TDA (wt. %) | M47 dilution[6] (mL) | Solution Solids (wt. %) | Viscosity (poise at 25° C.) | Yield Value (dynes/cm$^2$) | Slope | Shortness Ratio |
|---|---|---|---|---|---|---|---|---|---|
| 7 | Phenolic Resin[7] | none | 5.67 | 10.0 | 47.9 | 585 | 7,011 | 0.78 | 12.0 |
|   |   | SP-134 (1.48 wt. %) | 5.67 | 8.0 | 47.9 | 825 | 16,302 | 0.70 | 19.8 |
| 8 | Maleic Resin[8] | none | 9.0 | 10.5 | 47.9 | 276 | 2,821 | 0.80 | 10.2 |
|   |   | SP-134 (1.48 wt. %) | 9.0 | 7.0 | 47.9 | 557 | 12,022 | 0.69 | 21.6 |
| 9 | Hydrocarbon Resin[9] | none | 3.0 | 10.0 | 51.0 | 126 | 490 | 0.94 | 3.9 |
|   |   | SP-134 (5.0 wt. %) | 3.0 | 6.0 | 51.0 | 1105 | 45,459 | 0.60 | 41.1 |

[6]M47 dilution - 10 grams of resin are placed in a 250 mL beaker at 25° C. and small increments (about 0.1 to about 0.2 mL) MAGIESOL 47 ink oil commercially available from Magie Brothers Oil Company, Division of Pennzoil of Franklin Park, Illinois were added to the solution until the mixture became completely cloudy. The milliliters of oil added is the M47 dilution.
[7]Phenolic Resin - is a phenolic modified rosin ester resin having a softening point of 163° C., an acid number of 20, a solution viscosity of Z6.5 and a tolerance of 25 mLs.
[8]Maleic Resin - is a maleic modified rosin ester resin having a softening point of 160° C., an acid number of 16, a solution viscosity of Z6.3 and a tolerance of 22 mLs.
[9]Hydrocarbon Resin - is a hydrocarbon resin having a softening point of 160°, an acid number of 16, a solution viscosity of Z5 and a tolerance of 8 mLs.

As shown by the results given in Table 2, various types of resins can be used to form the self-gelled resin solutions according to the procedure of Example 1. The self-gelled resin solutions made with the crosslink agent have substantially higher yield and viscosity values and lower slopes than the corresponding resin solutions which do not use a crosslink agent at the same solution solids level.

EXAMPLE 3

Self-gelled resin solutions prepared according to the procedure of Example 1 using solvents other than EXXPRINT-238D are given in the following table. In each sample, the resin was a maleic modified rosin ester resin as described in Table 2 (footnote 7). The viscosities of the resin solutions were determined with a line to line Gardner-Holdt viscosity tube.

TABLE 3

| Sample No. | Solvent | Crosslink Agent | Solution Solids (wt. %) | Viscosity (SSU at 54.4° C.) |
|---|---|---|---|---|
| 10 | linseed oil | none | 50 | 695 |
|  |  | SP-134 (0.5 wt. %) | 50 | 1,557 |
| 11 | xylene | none | 60 | 11 |
|  |  | SP-134 (3.0 wt. %) | 60 | 65 |

As shown in Table 3, resin solutions made with crosslink agents have substantially higher viscosity at the same solution solids level than resin solutions made without the aid of a crosslink agent according to the invention even when using linseed oil or an aromatic solvent.

EXAMPLE 4

A self-gelled resin solution having 45 wt. % solids was prepared generally in accordance with the procedure of Example 1 and compared to resin solutions having 45 wt. % solids made by dissolving high viscosity resins in a solvent without the aid of a crosslink agent. The properties of the resin solutions are given in Table 4.

As demonstrated by the samples given in Table 4, self-gelled resins (samples 12 and 13) made according to the invention exhibited substantially higher viscosities and yield values than resin solutions made with high viscosity resins (samples 14 and 15) alone. The values given in Table 4 indicate superior rheological properties for self-gelled resins made according to the invention which none of the high viscosity resin solutions could obtain.

EXAMPLE 5

The amount of gel structures in the self-gelled resin solutions made according to the invention was compared to the amount of gel structures in a conventional resin solution. The Soxhlet extraction technique was used to determine the amount of gel structures remaining after extraction and drying each solution.

Self-gelled Resin Solution

In order to prepare a self-gelled resin solution according to the invention, 45 grams of N-40-HT oil, 10 grams of EXXPRINT-314A oil and 45.0 grams of phenolic modified rosin ester resin as described in footnote 6 of Table 2 were charged to a reaction vessel equipped with an agitator, temperature controller, condenser and nitrogen gas inlet. The mixture was heated to 200° C. under a nitrogen atmosphere and stirred until the resin was completely dissolved. Once the resin was dissolved, 2.0 grams of SP-134 were charged to the stirred reaction mass. The temperature of the reaction mass was maintained at 200° C. while stirring the reaction mass for an additional hour. Next the reaction mass was cooled to 100° C. and was pumped into a storage container. The solids level of the resin solution was 46.08 wt. %.

Conventional Resin Solution

The procedure for preparing a conventional resin solution was the same as for the self-gelled resin solution above with

TABLE 4

| | Solution Composition | | Viscosity | | | | |
|---|---|---|---|---|---|---|---|
| Sample No. | component | parts by weight | (poise at 25° C.) | Yield Value (dynes/cm$^2$) | Slope | Shortness Ratio | M47 Dilution (mL) |
| 12 | phenolic resin[10] | 41.75 | 364 | 4,423 | 0.78 | 12.2 | 11.5 |
|  | SP-134 | 3.25 |  |  |  |  |  |
|  | N-40-HT[11] oil | 36.9 |  |  |  |  |  |
|  | EXXPRINT-314A[12] | 18.1 |  |  |  |  |  |
| 13 | Maleic resin[13] | 30.0 | 855 | 7,852 | 0.81 | 9.2 | 8.8 |
|  | SP-134 | 15.0 |  |  |  |  |  |
|  | N-40-HT oil | 36.9 |  |  |  |  |  |
|  | EXXPRINT-314A | 18.1 |  |  |  |  |  |
| 14 | RL-56-cp[14] | 45.0 | 273 | 2,488 | 0.77 | 12.8 | 12.0 |
|  | N-40-HT oil | 36.9 |  |  |  |  |  |
|  | EXXPRINT-314A | 18.1 |  |  |  |  |  |
| 15 | PT-170-HV[15] | 45.0 | 282 | 2,858 | 0.80 | 10.1 | 7.0 |
|  | N-40-HT oil | 36.9 |  |  |  |  |  |
|  | EXXPRINT-314A | 18.1 |  |  |  |  |  |

[10]Phenolic Resin — is a phenolic modified rosin ester resin as described in footnote 6 of Table 2.
[11]N-40-HT oil — an ink oil commercially available from Magie Brothers Oil Company, Division of Pennzoil of Franklin Park, Illinois having a Kauri butanol value of 37, an aniline point of 64.4° C. and a distillation range of 246° to 302° C.
[12]EXXPRINT-314A — is an ink oil solvent commercially available from Exxon Chemical Company of Houston, Texas having a Kauri butanol value of 98, an aniline point of 12.8° C. and a distillation range of 231° to 277° C.
[13]Maleic resin — is maleic modified rosin ester resin with a softening point of 125° o 140° C., an acid number of 18-22, a solution viscosity of U-X, and a tolerance of 70–110 mL (M47).
[14]RL-56-cp — is a high molecular weight, high viscosity resin commercially available from Arizona Chemical Company, European Division of Niort, France.
[15]PT-170-HT — is a high molecular weight, high viscosity resin commercially available from Ascona Resins Company of Mendham, New Jersey.

the exception that 47.0 grams of phenolic resin was used and no SP-134 was charged to the reaction vessel. The solids level of the resulting resin solution was 46.08 wt. %.

Samples of both the self-gelled and the conventional resin solutions were weighed into different thimbles which were then placed in two Soxhlet extractors. The samples were extracted by toluene for 1.25 hours. Then the thimbles were removed from the Soxhlet extractors and dried. After drying there was 34.6 wt. % of gel fraction in the self-gelled resin solution sample but only 0.06 wt. % gel fraction in the conventional resin solution sample.

EXAMPLE 6

A comparison between a thermal reactive phenolic resin and an epoxy resin crosslink agent was made to determine what effects preparing self-gelled resin solutions from each of the crosslink agents have on viscosity and solubility of the resulting solutions. All of the samples were prepare by charging 45.0 grams of phenolic modified rosin ester resin as described in footnote 6 of Table 2, 45 grams of N-40-HT and 10 grams of EXXPRINT-314A to a reaction vessel equipped with an agitator, temperature controller, condenser and nitrogen gas inlet. The reaction mass mixture was heated to 200° C. under a nitrogen atmosphere and stirred until the resin was dissolved. After dissolving the resin, a crosslink agent was added to the mixture and the reaction mass temperature of 200° C. was maintained while stirring the reaction mass for an additional hour. The product was then cooled and pumped from the reaction vessel to a storage vessel.

The viscosity of the self-gelled resin solutions made by the foregoing procedure was determined by use of a DUKE D-2050 viscometer from Duke Custom System, Inc. of Pleasant View, Tenn. at 25° C. and at a shear rate of 2500 sec.$^{-1}$. The solubility of the resin solutions was determined by the M47 dilution method described above.

Figure 1:
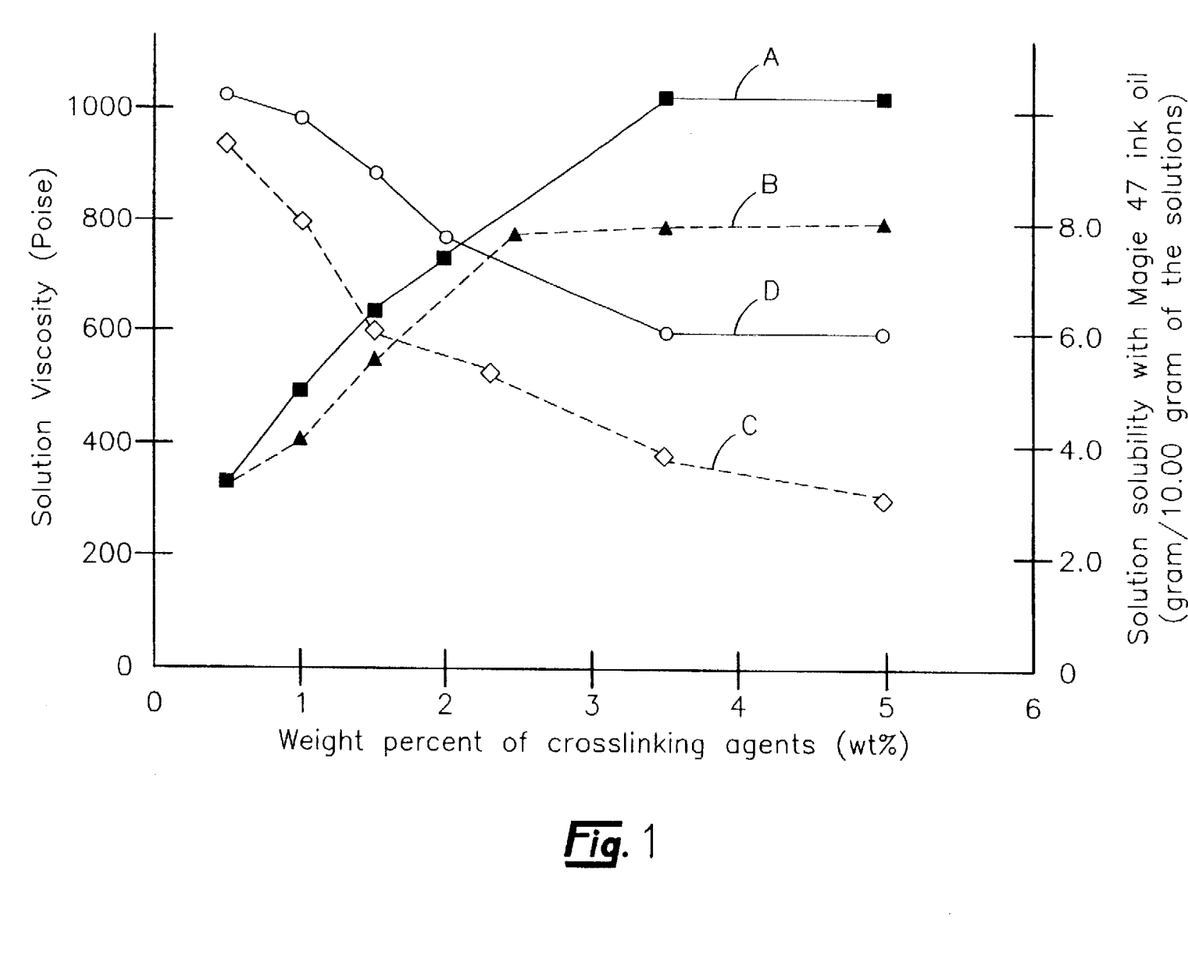
FIG. 1 is a graphical representation of the effects various crosslink agents have on the solution viscosity and solubility of self-gelled resins made according to the invention.

FIG. 1 illustrates the effects the crosslink agents have on viscosity and solubility of self-gelled resin solutions. As shown in the figure, a thermal reactive phenolic resin (SP-134 curve A) was more effective than an epoxy resin (DER-331 curve B) for enhancing the solution viscosity. For example, with 3.5 wt. % of SP-134 crosslink agent, the solution viscosity is 1048 poise, while with 3.5 wt. % DER-331 crosslink agent, the solution viscosity was only 793 poise. The epoxy resin also had more impact on the solution solubility than did the phenolic resin. For example, with 3.5 wt. % DER-331 crosslink agent (curve C), the solution solubility was 3.7 grams of M47 per 100.0 grams of solution, while with 3.5 wt. % of SP-134 crosslink agent (curve D), the solution solubility was 6.0 grams of M47 per 100.0 grams of solution.

EXAMPLE 7

In order to compare the properties of varnishes made with self-gelled resin solutions made according to the invention and conventional resin solutions, two ink varnishes were prepared. A conventional varnish was made by charging 37 grams of phenolic modified rosin ester resin (as described in footnote 6 of Table 2), 9 grams of BECKACITE-6006 (BC-6006) resin commercially available from Arizona Chemical Company of Panama City, Fla., 5 grams of linseed oil, 1.0 gram of FA-2 fatty acid commercially available from Arizona Chemical Company, 5.0 grams of ISOREZ #7 alkyd commercially available from the Degen Company of Jersey City, N.J. and 40.5 grams of M47 to a 500 mL three neck flask equipped with an agitator, temperature controller and nitrogen gas inlet. Nitrogen was used at a rate of 3.3 mL per minute to purge the flask. The flask was heated to 170° C. while stirring the reaction mixture until all of the resin was dissolved. Then 2.5 grams of 50 wt. % M47 solution of oxyaluminum octoate was slowly added into the vortex created by the agitator. The oxyaluminum octoate was reacted with the reaction mass for one hour at 170° C. The varnish resulting was then pumped to a suitable storage container and allowed to cool.

An ink varnish was made with the self-gelled resin made according to the invention by charging 74.0 grams of self-gelled resin solution, 10.0 grams of BC-6006 resin, 5.0 grams of linseed oil and 1.0 gram of FA-2 to a three neck flask equipped with an agitator, temperature controller and nitrogen gas inlet. The self-gelled resin solution was made from 45 wt. % phenolic modified rosin ester resin as described in footnote 6 of Table 2, 33 wt. % MAGIESOL 470 oil (an aliphatic ink oil from Magie Brothers Oil Company), 20 wt. % N-40-HT and 2.5 wt. % SP-134 resin according to the general procedure of Example 1. The flask was heated to 170° C. while stirring the reaction mixture until all of the BC-6006 resin dissolved. The varnish was sampled and tested on a DUKE D-2050 viscometer for viscosity. MAGIESOL 470 (M470), 5 grams total, was added to the vanish until a viscosity of about 600 to about 700 poise at 25° C. and a shear rate of 2500 sec.$^{-1}$ was obtained. MAGIESOL 470 has a Kauri butanol value of 26.5, an aniline point of 78.3° C. and a distillation range of 240° to 277° C. The resulting varnish was then pumped to a suitable storage container and allowed to cool.

Figure 2:
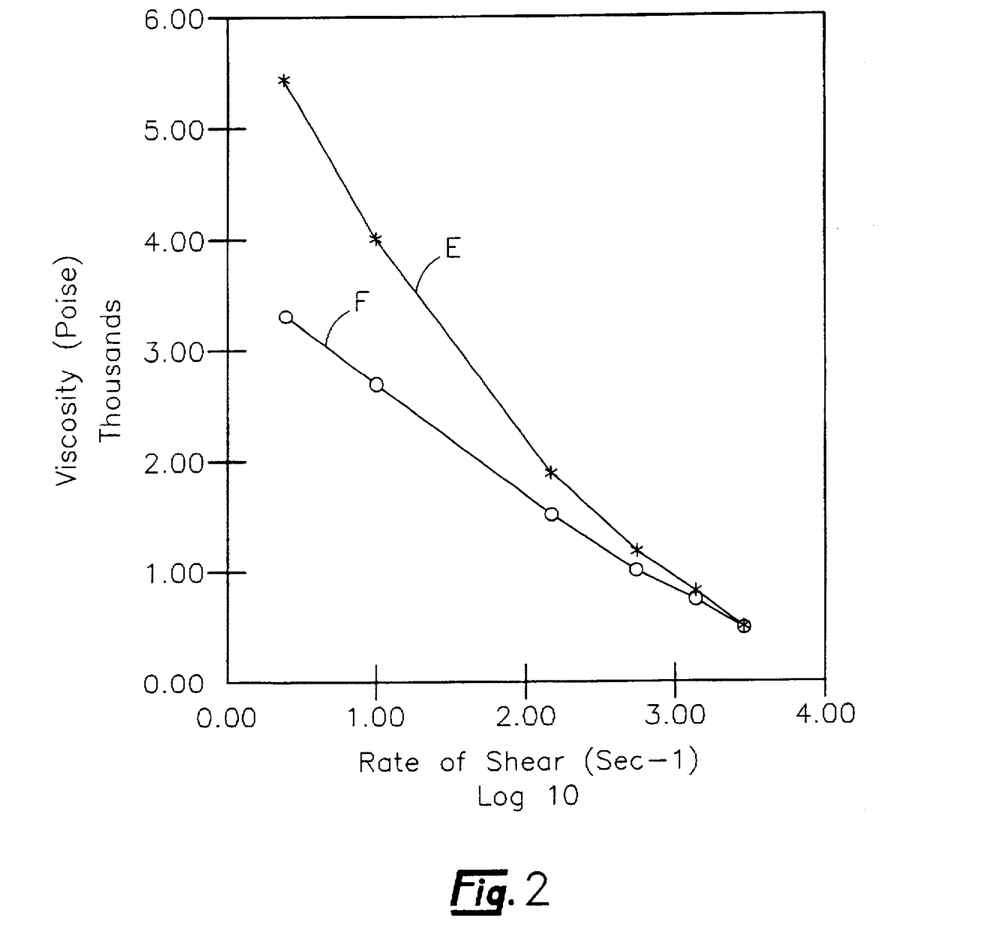
FIG. 2 is a graphical representation of viscosity versus shear rate of an ink varnish made with a self-gelled resin solution according to the invention and of a conventional ink varnish made with aluminum gellant.

The properties of the varnishes made with a conventional resin solution and with the self-gelled resin solution of the invention are illustrated in FIG. 2 and given in Table 5.

TABLE 5

| Sample No. | Varnish made from | M47 dilution (mL/10 grams of varnish) | Viscosity (poise at 2500 sec$^{-1}$ shear rate, 25° C.) | Yield Value (dynes/cm$^2$ at 2.5 sec$^{-1}$ shear rate) | Shortness Ratio |
|---|---|---|---|---|---|
| 16 | Conventional resin (Curve E) | 8.5 | 662 | 13,789 | 20.9 |
| 17 | self-gelled resin (Curve F) | 9.0 | 661 | 8,214 | 12.4 |

As illustrated by Table 5 and FIG. 2, both the conventional varnish (curve E) and the varnish made with the self-gelled resin (curve F) have similar viscosity at high shear rates. However, at low shear rates, the yield value and shortness ratio of the conventional varnish was much higher than that of the varnish made with the self-gelled resin. The lower slope of the varnish made with the self-gelled resin made according to the invention indicates the greater stability of the varnish as compared to the stability of varnish made with a conventional resin solution over a shear rate range of 2.5 to 2500 sec$^{-1}$.

EXAMPLE 8

Ink compositions were made with the varnishes of Example 7 according to the formulations. The formulations and properties are given in Table 6. The flush base contains 77.5 parts of MAGRUDER ATLAS SET FLUSH commercially available from Magruder Color Co., Inc. of Elizabeth, N.J.), 5.0 parts of S-394 N-1 and 2.0 parts of SST-3 (both commercial waxes available from Shamrock Technologies, Inc. of Newark, N.J.) and 15 parts of M47 oil. The inks were adjusted to the same tack value by adding slightly more M47 to the Ink B composition than to the Ink A composition.

TABLE 6

|  | Ink A (contains varnish made with conventional resin solution) | Ink B (contains varnish made with self-gelled resin solution) |
| --- | --- | --- |
| Ink Formulation (in grams) | | |
| Varnish made with conventional resin solution | 48 | 0 |
| Varnish made with self-gelled resin solution | 0 | 48 |
| Flush Base | 32 | 32 |
| M47 oil | 5.25 | 5.50 |
| Ink Properties | | |
| Tack (at 1200) | 11.8 | 11.8 |
| Viscosity (poise at 2500 sec.$^{-1}$ shear rate at 25° C.) | 246 | 199 |
| Yield Value (dynes/cm$^2$ at 2.5 sec.$^{-1}$ shear rate) | 2,135 | 1,430 |
| Shortness Ratio | 8.7 | 7.2 |
| Gloss[15] (at 60°) | 11.1 | 12.4 |
| Misting[16] | <1 | <1 |
| Density[17] | 1.80 | 1.94 |

[15]Gloss — determined with a Gardner glossmeter from BYK Garner, Inc. of Silver Spring, Maryland at 60° angle. Paper gloss was previously subtracted to eliminate paper variable.
[16]Misting — determined on an inkometer at 1200 rpm, 32.2° C. Scale: 0 = no misting, 10 = extreme misting.
[17]Density — determined with a Model SOS-40 digital reflection densitometer from Cosar Corporation of Dallas, Texas.

As can be seen in Table 6, Ink B containing a varnish made with a self-gelled resin solution made according to the invention had a lower viscosity, yield value and a higher color density and gloss than Ink A containing a varnish made with a conventional resin solution. Accordingly, Ink B is expected to provide better color transfer properties than Ink A.

The foregoing description of certain embodiments of the present invention has been provided for purposes of illustration only, and it is understood that numerous modifications and alterations may be made without departing from the spirit and scope of the invention as defined in the following claims. The embodiments described herein are the best mode known to applicant for practicing the invention, but it will be understood that other ways of producing high viscosity ink resins according to the claims are encompassed by the invention.

What is claimed is:

1. A process for making a high viscosity gelled ink resin composition which comprises mixing a rosin- or hydrocarbon-based resin with an organic solvent and a crosslink agent to provide a reaction mass and heating the reaction mass under conditions sufficient to produce a substantially covalently cross-linked gelled resin solution which exhibits significantly increased viscosity as compared to the uncrosslinked resin solution and has improved stability against viscosity loss and elasticity degradation from mechanical and thermal stresses imposed during its use in high speed printing machines.

2. The process of claim 1 wherein the reaction is conducted under a nitrogen atmosphere.

3. The process of claim 1 wherein the resin is a rosin-based resin comprising an ester of modified rosin.

4. The process of claim 1 wherein the resin is a rosin-based resin which comprises a maleic modified rosin ester resin having a softening point in the range of from about 150° to about 170° C., an acid number of no more than about 25, a solution viscosity in the range of from about Z5.0 to about Z7.0, and a M47 tolerance of from about 15 to about 30 mLs.

5. The process of claim 1 wherein the resin is a rosin-based resin which comprises a phenolic modified rosin ester resin having a softening point in the range of from about 150° to about 180° C., an acid number of less than about 25, a solution viscosity ranging from about Z5.5 to about Z8.0, and a M47 tolerance of at least about 10 mLs.

6. The process of claim 1 wherein the resin is a hydrocarbon-based resin which comprises a functionalized cyclic or dicyclic unsaturated hydrocarbon resin derived from a hydrocarbon feed containing from about 5 to about 15 carbon atoms, having a softening point of from about 145° to about 170° C., a solution viscosity ranging from about Z2.5 to about Z5.5 based on a 50 wt. % solution in ink oil and a M47 tolerance ranging from about 4 to about 15 mLs.

7. The process of claim 1 wherein the crosslink agent is selected from the group consisting of epoxy resins, organosilane compounds, aromatic dicarboxylic acid anhydrides, isocyanates and heat reactive phenolic compounds.

8. The process of claim 1 wherein the crosslink agent is a phenolformaldehyde resin containing one or more reactive methylol groups.

9. The process of claim 1 wherein the crosslink agent is a heat reactive phenolic compound derived from butyl phenol-bisphenol-A.

10. The process of claim 9 wherein the resin and phenolic compound are reacted until a solution viscosity in the range of from about 350 to about 1500 poise at 25° C. is obtained.

11. The process of claim 10 wherein the amount of phenolic compound ranges from about 0.5 to about 5 wt. % based on the total reaction mass weight.

12. The process of claim 1 wherein the organic solvent is a high boiling organic solvent having a boiling point in the range of from about 220° to about 310° C.

13. A lithographic ink formulation comprising from about 30 to about 60 wt. % of the resin composition of claim 1, from about 20 to about 60 wt. % phthalocyanine heatset flush and from about 1 to about 10 wt. % ink oil.

14. A process for making a high viscosity gelled resin which comprises:

charging a stirred reaction vessel with a high boiling organic solvent;

heating the solvent to a temperature within the range of from about 120° to about 180° C.;

feeding molten ink resin to the heated solvent with stirring to form a reaction mass containing from about 30 to about 60 wt. % resin;

heating the reaction mass to a temperature within the range of from about 160° to about 220° C.;

adding a sufficient amount of a heat reactive phenolic compound to the reaction mass while maintaining the reaction temperature in the range of from about 160° to about 220° C. to obtain a solution viscosity of at least about 300 poise at 25° C.

15. The process of claim 14 wherein the reaction mass is heated under a nitrogen atmosphere.

16. The process of claim 14 wherein the ink resin is selected from the group consisting of maleic acid modified rosin ester resin, phenolic rosin resin, modified hydrocarbon resin and unmodified hydrocarbon resin.

17. The process of claim 14 wherein the ink resin is a rosin-based resin which comprises a maleic modified rosin ester resin having a softening point in the range of from about 150° to about 170° C., an acid number of no more than about 25, a solution viscosity in the range of from about Z5.0 to about Z7.0, and a M47 tolerance of from about 15 to about 30 mls.

18. The process of claim 14 wherein the ink resin is a rosin-based resin which comprises a phenolic modified rosin ester resin having a softening point in the range of from about 150° to about 180° C., an acid number of less than about 25, a solution viscosity ranging from about Z5.5 to about Z8.0, and a M47 tolerance of at least about 10 mLs.

19. The process of claim 14 wherein the ink resin is a hydrocarbon-based resin which comprises a functionalized cyclic or dicyclic unsaturated hydrocarbon resin derived from a hydrocarbon feed containing from about 5 to about 15 carbon atoms, having a softening point of from about 145° to about 170° C., a solution viscosity ranging from about Z2.5 to about Z5.5 based on a 50 wt. % solution in ink oil and a M47 tolerance ranging from about 4 to about 15 mLs.

20. The method of claim 14 wherein the phenolic compound is a phenol-formaldehyde resin containing one or more reactive methylol groups.

21. The process of claim 14 wherein the phenolic compound is derived from butyl phenol-bisphenol-A.

22. The process of claim 14 wherein the organic solvent has a boiling point in the range of from about 220° to about 310° C.

23. An ink vehicle comprising the gelled resin of claim 14.

24. A method for making a gelled ink vehicle which comprises:

charging a reaction vessel with a high boiling organic solvent;

heating the solvent to a temperature within the range of from about 120° to about 220° C.;

feeding a molten resin selected from the group consisting of rosin- and hydrocarbon-based resins into the reaction vessel to form a reaction mass;

adding a heat reactive phenolic compound to the reaction mass and then stirring and heating the reaction mass for a period of time sufficient to cause the formation of covalent cross-link bonds in the resin so as to provide a gelled ink vehicle of substantially increased viscosity and which exhibits improved stability against the effects of shear forces.

25. The method of claim 24 wherein the reaction mass is heated and stirred under a nitrogen atmosphere.

26. The method of claim 24 wherein the resin comprises an ester of a modified rosin.

27. The process of claim 26 wherein the modified rosin is a maleic modified rosin ester resin having a softening point in the range of from about 150° to about 170° C., an acid number of no more than about 25, a solution viscosity in the range of from about Z5.0 to about Z7.0, and a M47 tolerance of from about 15 to about 30 mLs.

28. The process of claim 24 wherein the rosin-based resin is comprised of a phenolic modified rosin ester resin having a softening point in the range of from about 150° to about 180° C., an acid number of less than about 25, a solution viscosity ranging from about Z5.5 to about Z8.0, and a M47 tolerance of at least about 10 mLs.

29. The process of claim 24 wherein the hydrocarbon-based resin comprises a functionalized cyclic or dicyclic unsaturated hydrocarbon resin derived from a hydrocarbon feed containing from about 5 to about 15 carbon atoms, having a softening point of from about 145° to about 170° C., a solution viscosity ranging from about Z2.5 to about Z5.5 based on a 50 wt. % solution in ink oil and a M47 tolerance ranging from about 4 to about 15 mLs.

30. The process of claim 24 wherein the organic solvent has a boiling point in the range of from about 220° to about 310° C.

31. An ink varnish composition comprising the ink vehicle of claim 24.

32. A lithographic ink formulation comprising from about 30 to about 60 wt. % of the ink varnish of claim 31, from about 20 to about 60 wt. % phthalocyanine heatset flush and from about 1 to about 10 wt. % ink oil.

* * * * *

UNITED STATES PATENT AND TRADEMARK OFFICE
CERTIFICATE OF CORRECTION

PATENT NO. : 5,763,565
DATED : June 9, 1998
INVENTOR(S) : Theodore J. Williams and Zheng Lu It is certified that error appears in the above-identified patent and that said Letters Patent is hereby corrected as shown below:

Column 5, line 43, change "Theological" to -- rheological --.

Column 8, line 66, change "Theological" to -- rheological --.

Column 12, line 6, change "Theological" to -- rheological --.

Signed and Sealed this

Twenty-fifth Day of August, 1998

Attest:

BRUCE LEHMAN

*Attesting Officer*    *Commissioner of Patents and Trademarks*